(No Model.)
C. E. BEALE & C. C. JEWELL.
SPRING TIRE FOR BICYCLE OR OTHER WHEELS.
No. 551,152. Patented Dec. 10, 1895.
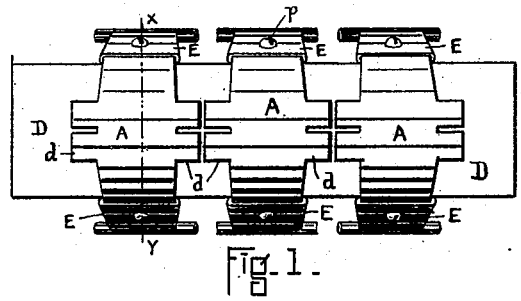
Fig. 1.
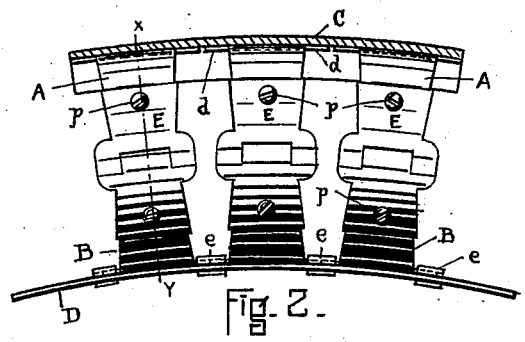
Fig. 2.
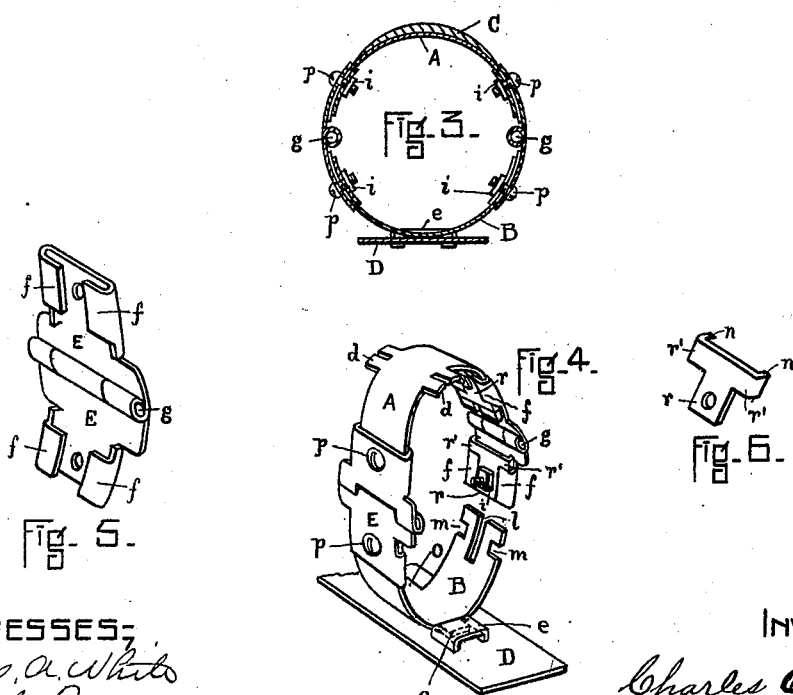
WITNESSES:
Chas. A. White
Jos. C. Bruce
INVENTORS
Charles E. Beale
Charles C. Jewell

UNITED STATES PATENT OFFICE.

CHARLES E. BEALE AND CHARLES C. JEWELL, OF BOSTON, MASSACHUSETTS.

SPRING-TIRE FOR BICYCLE OR OTHER WHEELS.

SPECIFICATION forming part of Letters Patent No. 551,152, dated December 10, 1895.

Application filed May 27, 1895. Serial No. 550,903. (No model.)

*To all whom it may concern:*

Be it known that we, CHARLES E. BEALE and CHARLES C. JEWELL, citizens of the United States, residing in Boston, in the county of Suffolk and Commonwealth of Massachusetts, have invented a new and useful Spring-Tire for Bicycle or other Wheels, of which the following is a specification.

Our invention relates to improvements in tires of wheels where steel springs are used instead of air in rubber tubes; and the objects of the invention are, first, to provide a flexible running surface in wheel-tires in which steel springs take the place of air; second, to produce a tire which shall not be subject to the various inconveniences arising from the use of pneumatic and other existing tires; third, to reduce to a minimum the liability of breakage of springs; fourth, to render repair or substitution of springs the work of a few minutes only, performed at the moment of occurrence of an accident wherever it takes place, on account of the ready substitution of any parts of the springs and not necessarily of a whole spring, and, fifth, to make the running as nearly frictionless and noiseless as possible in a steel-spring tire. We attain these objects by the mechanism illustrated in the accompanying drawings, in which—

Figure 1 is a top view of a section showing three springs of the tire on the wheel-rim D of the tire. Fig. 2 is a side elevation of the same, showing attachment to the wheel-rim of the tire and the rubber tread-piece C. Fig. 3 is a cross-sectional view of one whole spring and the rubber tread-piece C at the line $x\,y$ in Figs. 1 and 2 and its attachment to the wheel-rim D of the tire. Fig. 4 is a view in perspective of one whole spring and its attachment to the wheel-rim D of the tire, with one end of the rim-spring withdrawn from flanges of hinge. Fig. 5 shows one hinge of a spring disconnected and without its binders. Fig. 6 shows one binder of a hinge.

Similar letters refer to similar parts throughout the several views.

All the springs in a tire are alike. Hence a description of our preferred form of one whole spring and its attachments is a description of every other spring of said preferred form of construction. Each whole spring of the tire of our preferred form of construction consists of four principal parts—to wit, an under or rim semicircular steel spring B, having tongues $o\,o$ on each side, as shown in Fig. 4, an upper or running semicircular steel spring A, having slit tongues $d\,d$ on each side, as shown in Figs. 1 and 4, and two lateral metal or hardened-rubber hinges, each constructed as shown in Fig. 5, having a hinge-pin $g$, with friction-bushings, two cheeks E E, bearing-flanges $f\,f$, the spaces between and behind which are fitted with cross-shaped binders $r\,r$, (shown in Fig. 6,) held in position by screws $p\,p$, passing through the cheeks E E of the hinges and into the nuts $i\,i$, as shown in Figs. 3 and 4; but while the above is our preferred form of construction we may find it desirable in some cases to make the hinges an integral part of the rim and running springs, so that to form the circular or elliptical compound spring it will only be necessary to insert the hinge pins or bolts into the adjusted curved ends of the rim and running springs. In our preferred form of construction these parts are united to form a circular or elliptical tire-spring by inserting the ends of the rim-spring B and the running spring A into opposite flanges $f\,f\,f\,f$ on the cheeks E E E E of the two lateral hinges, as shown in Fig. 4.

The ends of the rim-spring and the running spring have each a central slot $l$ to permit them to be slipped in and out of the flanges $f\,f$ upon loosening without withdrawing the binder-screws $p\,p$, said loosening of the screws being only sufficient to let the lugs $n\,n$ (shown on the cross-bars $r'\,r'$ of the binder $r\,r'$ in Fig. 6) out of the side notches $m\,m$ near the ends of the springs A and B, as shown in Fig. 4. The binder $r\,r'$, as it appears in Fig. 6, fits into the open spaces between and behind the flanges $f\,f$ on each cheek E E of the hinges as they appear in Fig. 5, and the binder-screws $p\,p$, passing through the cheeks E E of the hinges and the stems $r\,r$ of the binders, turn into the nuts $i\,i$, as shown in Figs. 3 and 4. The turning of the screws into the nuts draws the lugs $n\,n$ of the binders into the side notches $m\,m$ of the springs, thus holding the springs in position in the hinges without bringing any bearing-strain upon the screws. The hinge-pin $g$ has a friction-bushing in all the springs, whether the hinges are made of nickel, steel, wrought-iron, or hardened rubber, and it is for the purpose of reducing friction as much as possible, as well as to make the parts interchangeable, that we propose to make the hinges of different material from the rim and running springs.

The rim-springs and the running springs are to be of steel, of greater or less thickness and strength proportionate to the weight to be borne, and when need requires they will be made double, but the principle of construction will be the same.

The tongues $d\ d$ of the running springs are slit longitudinally in the center, as shown in Figs. 1 and 4, to permit an even action of the spring, and they are made a part of the spring in order to furnish a surface support to the rubber tread-piece C and to render the tire as light as possible by a separation of the springs.

We propose to have the springs retain their circular form in light wheel-tires and an elliptical form in tires where the weight to be borne will not permit the retention of the circular form without making the tire too heavy.

The tire consists of a series of such springs as are hereinbefore described, fastened side by side, with the line $x\ y$ of each spring, at right angles to the running direction of the wheel, upon the convex surface of the flat wheel-rim D of the tire, as shown in Fig. 2, entirely around the said rim, and having the entire convex surface of the running springs between the hinges covered with the rubber tread-piece C, as shown in Fig. 2, crescent-shaped in cross-section, as shown in Fig. 3, fastened when necessary to the slit tongues $d\ d$ of the running springs and extending circumferentially completely around the tire, for a running surface. The ends of the tongues $o\ o$ of the rim-springs will be placed in contact and held securely to the wheel-rim D of the tire by clamps $e\ e$, passing over the said tongues and through slots in the wheel-rim of the tire or otherwise. This arrangement of the springs upon the wheel-rim D of the tire will cause a very slight separation of the tongues of the running springs, as shown in Figs. 1 and 2, the object of the tongues being to separate the springs and thus lighten the tire as much as possible, and at the same time afford a support for the rubber tread-piece C, as nearly continuous as is consistent with separate action of the springs, which is necessary to give a sufficiently-elastic action to the tire. The whole tire thus prepared may be incased in a readily-removable rubber or other covering to keep out dust and mud, if desired.

The wheel-rim of the tire is to be flat in cross-section, as shown in Fig. 3, to allow of the free action of the rim-springs, and may be made of any metal, or wood, or other material of sufficient strength.

What we claim as our invention, and desire to secure by Letters Patent, is—

1. A bicycle or other wheel tire, formed by a combination of bilateral-hinged, and independently acting circular or elliptical steel springs with friction bushings, fastened side by side upon the flat wheel-rim of the tire, and having for the running surface of the tire a rubber tread-piece, crescent shaped in cross-section, and extending circumferentially upon and over the upper convex surfaces of all the springs entirely around the tire, substantially as shown.

2. A bicycle or other wheel tire, formed by a combination of bilateral-hinged and independently acting circular or elliptical metal springs, each constructed of two lateral metal or hardened-rubber hinges, with friction bushings, bearing an under or rim semicircular steel spring "B," and an upper or running semicircular steel spring "A," with all the parts interchangeable with the rim-spring sections B, B, of all the springs fastened side by side upon the flat wheel-rim "D" of the tire, and the running-spring sections of all the springs covered, for the running surface of the tire, with a rubber tread-piece "C," crescent shaped in cross-section, and extending circumferentially upon and over their convex surfaces between the hinges entirely around the tire, substantially as shown.

3. A bilateral-hinged and independently acting circular or elliptical metal spring, formed by a combination of two distinct lateral metal or hardened-rubber hinges "E, E," with friction bushings, fitted to an under or rim semicircular steel spring "B," and an upper or running semi-circular steel spring "A," substantially as set forth, for the purpose specified.

4. A bicycle or other wheel tire, formed by a combination of bilateral-hinged circular or elliptical metal springs,—each consisting of two lateral metal or hardened-rubber hinges "E, E" with friction bushings, an under or rim semi-circular steel spring "B," and an upper or running semi-circular steel spring "A," united into a circular compound spring by fitting the ends of the rim-spring and the running-spring into opposite flanges "$f, f$" on the cheeks, "E, E" of the two hinges, and there fastening them by the binders $r, r'$,—all said springs having the rim-spring sections "B, B" fastened side by side upon the flat wheel-rim "D" of the tire, and the running-spring sections "A, A" of all the springs covered, for the running surface of the tire, with a rubber tread-piece "C," crescent-shaped in cross-section, extending circumferentially upon and over their convex surfaces between the hinges entirely around the tire, substantially as described.

5. A bilateral-hinged circular or elliptical metal spring, formed by a combination of two lateral metal or hardened-rubber hinges "E, E," with friction bushings, an under or rim semi-circular steel spring "B," and an upper or running semi-circular steel spring "A," united into a circular compound spring by fitting the ends of the rim-spring "B" and the running-spring "A" into opposite flanges *f, f*, on the cheeks "E, E" of the two hinges, and there fastening them by the binders *r, r'*, substantially as shown, for the purpose specified.

6. A bicycle or other wheel tire, formed by a combination of bilateral-hinged circular or elliptical metal springs,—each consisting of two lateral metal or hardened-rubber hinges "E, E," with friction bushings, an under or rim semi-circular steel spring "B," and an upper or running semi-circular steel spring "A," united into a circular compound spring by fitting the ends of the rim spring and running spring into opposite flanges "*f, f*," on the cheeks "E, E," of the two lateral hinges, and there fastening them by the binders *r, r'*, the stems, *r, r*, and cross-bars, *r' r'*, of which are adapted to the open spaces between and behind the flanges "*f, f*," on the hinges, thus permitting the lugs "*n, n*" of the binders to lock into the side notches "*m, m*" near the ends of the springs, where they are held by the binder screws "*p, p*," turned into the nuts "*i, i*,"—all said springs having the rim-spring sections "B, B" fastened side by side, but sufficiently apart to act independently, upon and completely around the circumference of the flat wheel-rim "D" of the tire, and the running spring sections "A, A" covered, for the running surface of the tire, with a rubber tread-piece "C," crescent-shaped in cross-section, extending circumferentially upon and over their convex surfaces between the hinges, entirely around the tire, substantially as set forth.

7. A bilateral-hinged circular or elliptical metal spring, formed by a combination of two lateral metal or hardened rubber hinges "E, E," with friction bushings, an under or rim semi-circular steel spring "B," and an upper or running semi-circular steel spring "A," united into a compound spring by fitting the ends of the rim-spring and the running-spring into opposite flanges "*f, f*" on the cheeks "E, E" of two lateral hinges, and there fastening them by the binders "*r, r'*," the stems "*r, r*" and cross-bars "*r', r'*" of which are adapted to the open spaces between and behind the flanges "*f, f*," on the cheeks of the hinges "E, E," shown in Fig. 5, thus permitting the lugs "*n, n*," of the binders to lock into the notches "*m, m*," near the ends of the springs, where they are held by the binder screws "*p, p*," turned into the nuts "*i, i*,"—the screws being free from bearing strain, substantially as described, for the purpose specified.

8. A bicycle or other wheel tire, formed by a combination of bilateral-hinged circular or elliptical metal springs,—each consisting of two lateral metal or hardened rubber hinges "E, E," with friction bushings, and bearing binders "*r, r'*," an under or rim semi-circular steel spring "B," having, as a part of the spring, a tongue "*o*" on each side, and an upper or running semi-circular steel spring "A," having, as part of the spring, slit tongues, "*d, d*," on each side, united into a compound, spring,—all said springs having the rim-spring sections B, B, fastened, with the ends of their tongues in contact, upon and completely around the circumference of the flat wheel-rim by clamps "*e, e*," passing over the tongues and through slots in said rim, and the running-spring sections "A, A" covered, for the running surface of the tire, with a rubber tread-piece "C," crescent-shaped in cross-section, fastened to the slit tongues "*d, d*" and extending circumferentially upon and over their convex surfaces, between the hinges, entirely around the tire, substantially as described.

9. A bilateral-hinged circular or elliptical metal spring, formed by a combination of two lateral metal or hardened rubber hinges "E, E," with friction bushings, and bearing binders "*r, r'*;" an under or rim semi-circular steel spring "B," having, as part of the spring, a tongue "*o*," on each side, and an upper or running semi-circular steel spring "A," having, as part of the spring, slit tongues "*d, d*" on each side, substantially as set forth, for the purpose specified.

10. A bicycle or other wheel tire, formed by a combination of bilateral-hinged circular or elliptical metal springs,—each consisting of two lateral metal or hardened rubber-hinges "E, E," with friction bushings, bearing cross-shaped binders "*r, r'*," held in position by the screws "*p, p*," turning in the nuts "*i, i*," an under or rim semi-circular steel spring "B," having, as a part of the spring, tongues "*o, o*," and an upper or running semi-circular steel spring "A," having, as a part of the spring, slit tongues "*d, d*," united into a compound spring, easily separated into its parts, the slots "*l, l*," in the ends of the rim and running springs permitting them to be withdrawn from the flanges "*f, f*," by simply loosening the screws "*p, p*," without removing them,—all said springs having the rim-spring sections "B, B" fastened, with the ends of their tongues "*o, o*," in contact, upon and completely around the circumference of the flat wheel-rim "D," by clamps "*e, e*," passing over the said tongues and through slots in the said rim, and the running spring sections "A, A," covered, for the running surface of the tire, with a rubber tread-piece "C," crescent-shaped in cross-section, fastened to the slit tongues "*d, d*," and extending circumferentially upon and over the convex surface, between the hinges, entirely around the tire, substantially as set forth.

11. A bilateral-hinged circular or elliptical metal spring, formed by a combination of two lateral metal or hardened-rubber hinges "E, E," with friction bushings, bearing cross-shaped binders, "*r, r'*," held in position by the screws "*p, p*," turning in the nuts, "*i, i*," an under or rim semi-circular steel spring "B," having, as a part of the spring, tongues "*o, o*," and an upper or running semi-circular spring "A," having, as a part of the spring, slit tongues "$d, d$,"—the rim and running springs having slots "$l, l$" in their ends to permit their removal from the flanges of the hinges by simply loosening, without removing, the screws "$p, p$," sustantially as set forth, for the purpose specified.

12. A bicycle or other wheel tire, formed by a combination of bilateral-hinged circular or elliptical metal springs, having interchangeable parts, (each spring consisting of two similar lateral metal or hardened-rubber hinges "E, E," with friction bushings, bearing cross-shaped binders "$r, r'$," with lugs "$n, n$," at each end of the cross-bars "$r' r'$," an under or rim semi-circular steel spring "B," having, as a part of the spring, the tongues "$o, o$," and an upper or running semi-circular steel spring "A," having, as a part of the spring, slit tongues "$d, d$,") all said springs having the rim-spring sections "B, B" fastened, with the ends of their tongues "$o, o$" in contact, upon and completely around the circumference of the flat wheel-rim "D," by clamps "$e, e$" passing over the said tongues and through slots in the said rim, and the running-spring sections "A, A," covered, for the running surface of the tire, with a rubber tread piece "C," crescent-shaped in cross-section, fastened to the slit tongues "$d, d$," and extending circumferentially upon and and over the convex surfaces, between the hinges, entirely around the tire, substantially as described.

13. A bilateral-hinged circular or elliptical metal spring, formed by a combination of interchangeable parts, consisting of two similar lateral metal or hardened-rubber hinges "E, E," with friction bushings, bearing cross-shaped binders "$r, r'$," with lugs "$n, n$" at each end of the cross-bars "$r', r'$," an under or rim semi-circular steel spring "B," having, as a part of the spring, the tongues "$o, o$," and an upper or running semi-circular steel spring "A," having, as part of the spring, slit tongues "$d, d$," substantially as described, for the purpose specified.

CHARLES E. BEALE.
CHARLES C. JEWELL.

Witnesses:
CHAS. A. WHITE,
JOS. C. BRUCE.